Feb. 5, 1946. B. BRUNTON ET AL 2,394,146
CONSTRUCTION OF PANELS FOR USE IN BUILDING
Filed April 8, 1943 2 Sheets-Sheet 2
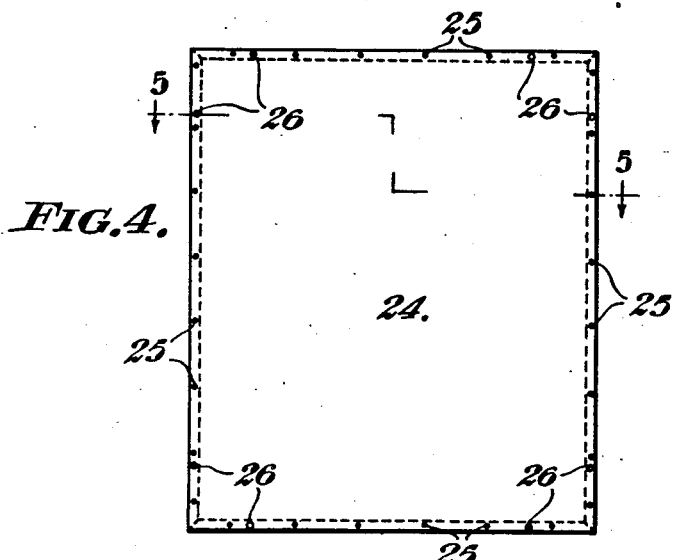
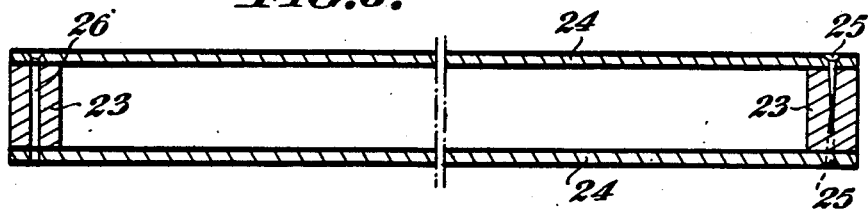
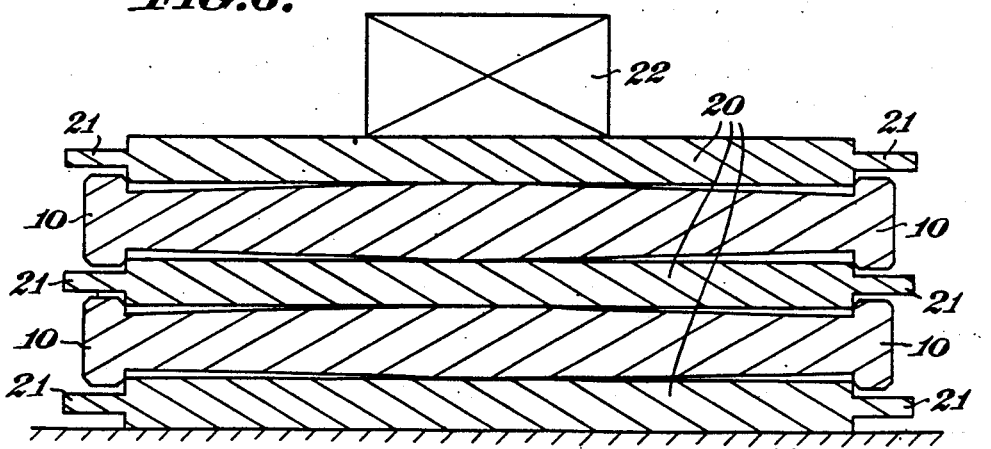
INVENTORS
BERNARD BRUNTON
ROLFE G. BOOTH Patented Feb. 5, 1946

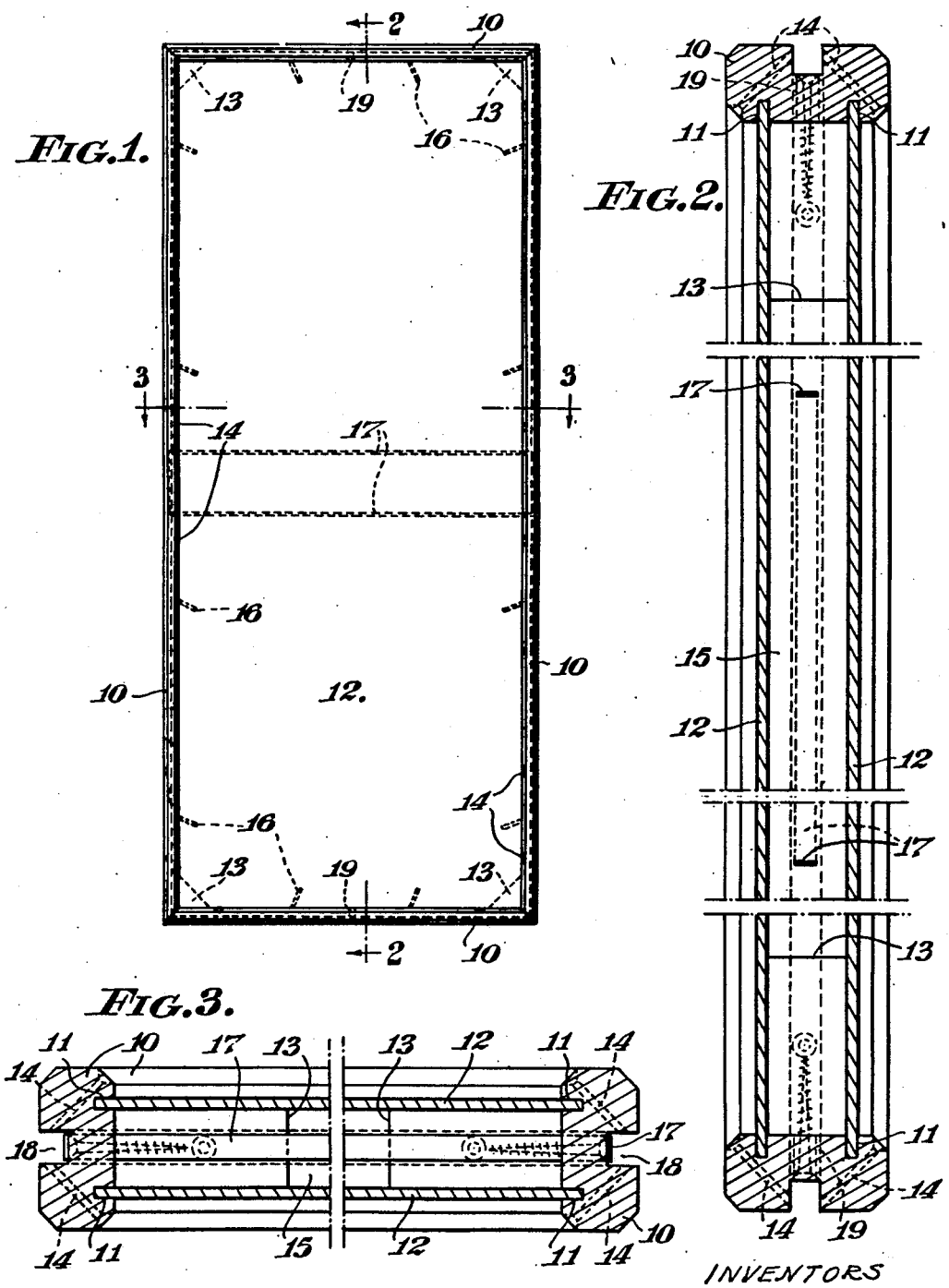

2,394,146

UNITED STATES PATENT OFFICE 2,394,146

CONSTRUCTION OF PANELS FOR USE IN BUILDING

Bernard Brunton and Rolfe Gilbert Booth, London, England

Application April 8, 1943, Serial No. 482,302
In Great Britain January 19, 1942

1 Claim. (Cl. 20—15)

This invention relates to improvements in building panels, and an object of the invention is to provide composite panels having desirable physical characteristics as to strength, durability and thermal insulation, which are of lightweight construction and easy and inexpensive to manufacture. A further object is to provide an improved method of manufacturing a panel having a moulded core faced with sheet material.

A building panel according to this invention comprises a closed frame forming the peripheral sides of the panel and carrying a pair of facing sheets in substantially parallel spaced-apart relation so that the frame and sheets together form a closed box within which is contained a rigid cellular or lightweight moulded core which is formed of a set and hardened plastic composition and which is united with the interior walls of the box.

In the preferred constitution, the panel comprises a wood frame carrying asbestos cement facing sheets, the interior of the box formed by said frame and sheets being filled with a rigid cellular core of wood wool bound with cement, which core is bonded to the asbestos cement sheets and keyed to the wood frame.

The facing sheets may be held by their edges in grooves in the frame, which may provide the panel with an all-round projecting moulding outstanding from the faces of the sheets, which moulding facilitates the assembling together of a plurality of the panels. The assembly of the frame and facing sheets may, alternatively, provide the panel with flush surfaces; for which purpose, the frame may be rebated and throated to receive the edges of the sheets in its rebate, or in another arrangement the sheets may cover the frame.

The invention also embraces a method of manufacturing a building panel having a moulded core faced with sheet material, wherein a mouldable core composition is pressed and formed to shape in a mould which is constituted by the sheet material and a frame form and which is incorporated with said composition during moulding thereof, whereby the mould forms part of the fabricated panel, constituting the facing thereof.

The fabrication of the improved panels may be carried out by a method wherein an eventually closed box formed of framing members and sheet facing material is partially constructed so as to form an open box which is thereafter packed with the hardenable plastic composition in such quantity as will exert pressure from internally upon the box walls when the box is closed, the construction of the box then being completed to form the closed box which encloses said composition under said internal pressure, counter-pressure being then applied externally to said box and maintained while said composition is caused or allowed to set and harden.

In the accompanying drawings:

Figure 1 illustrates, in elevation, one form of panel embodying the invention and suitable for use as a wall-forming unit, Figures 2 and 3 are sectional side and plan views taken on lines 2—2 and 3—3 of Figure 1 respectively, Figure 4 illustrates, in elevation, another form of panel embodying the invention and suitable for use as a roof-forming unit, Figure 5 is a sectional plan view taken on line 5—5 of Figure 4, and Figure 6 illustrates a stage in the manufacture of panels of the form illustrated in Figures 1 to 3.

Before proceeding with a detailed description, it must first be mentioned that, for clearness of illustration, the core filling of the panels is not shown in the drawings.

Referring to Figures 1 to 3, the panel therein illustrated comprises a closed rectangular light wooden frame 10, the four framing members of which are formed with a pair of parallel grooves 11 in their inner faces, which receive the edges of a pair of asbestos cement facing sheets 12, whereby the sheets are held in the frame in parallel spaced-apart relation, as shown. The frame is fitted with wood block corner brackets 13 located between the grooves. It will be observed that the frame defines the peripheral sides of the panel and also, in the form shown, provides the panel with an all-round projecting moulding outstanding from both faces of the panel, by means of which the assembly together of a plurality of such panels is facilitated, the frame being provided for assembly purposes with countersunk angle screw holes 14 spaced in pairs around the frame. The frame 10 and facing sheets 12 together form a box closed on all sides, the interior 15 of which is filled with a set and hardened composition of wood wool and cement which provides the panel with a rigid but lightweight, cellular core and which is cement-bonded to the facing sheets and keyed to the frame by suitable keying elements such as nails 16 secured in the frame and embedded in the core. A long panel, such as illustrated, is advantageously provided with an internal tie between the long members of the frame at their middle region in order to prevent any tendency for those members to bow during screwing-up on assembly. Such a tie preferably consists of a length of steel tape 17 which is threaded through four mortice slots cut transversely in the external groove 18 in the long frame members, two slots in each member, and which is brought to tension and its ends sealed together at the centre of the frame. It will be understood that the tie 17 becomes embedded in the core. The frame also has a hole 19 through the middle of each of its short members for ventilation of the core.

In a preferred method of manufacturing a panel as just described, upon a flat work table or similar surface, the frame is partially assembled with three of its framing members, conveniently the two long members and one short member, and one of the facing sheets 12 is slid into position in the groove 11 which is lowermost. The thus far partial assembly of the eventual closed box of the panel forms an open box ready for packing in the core filling. However, before undertaking this operation, the inner surface of the asbestos cement sheet is prepared by first thoroughly soaking it with a spray of water so as to avoid excessive suction and ensure good adhesion, and then applying to it a liberal coating of a slurry mix of cement and water. Also, the keying elements or nails 16 are prepared by applying to each of them a quantity of a stiff grout of cement and water so that the nail is thoroughly embedded.

Wood wool coated with cement slurry, for instance by immersing the wood wool in a slurry mix after saturation with water, is packed into the open box as evenly as possible and brought as near the open end of the frame as conveniently possible. A sufficient depth of wood wool should be packed to obtain a natural pressure from the wood wool upon the box walls when the second facing sheet, which is prepared similarly as was the first sheet, is slid into position in the upper groove 11. It now remains to complete the filling of the remaining short end of the box and to assemble the fourth frame member, thus closing the box and fixing the facing sheets. Keying elements provided on that frame member will be grouted as already described, before assembly of the member.

It is preferred to employ a rapid hardening cement throughout the process, and it will be appreciated that under this condition the packing of the cement-coated wood wool must proceed immediately following the slurrying of the bottom facing sheet and grouting of the frame keys, and before the cement in any of these components has had an opportunity to commence setting. There should likewise be no delay in assembling the top facing sheet and last frame member. Furthermore, as a correctly packed panel will have a tendency to bulge on the two asbestos sheet faces owing to the internal pressure, it is imperative that external pressure be applied to the panel as soon as possible after the closure stage, so as to press out the bulge before any initial setting of the cement occurs. This may be accomplished by jigging the panel in the manner illustrated by Figure 6.

After the panel has been completed it is laid on a wooden jig of the character illustrated in Figure 6 comprising a rectangular body 20 dimensioned to fit snugly within the frame 10 of the panel and provided with projecting horns 21 which come opposite the frame members and are of thickness equal to double the depth of the moulding projecting from one face of the panel.

A true level surface is provided for the first jig which is placed on that surface and the first completed panel is laid on the first jig so that the face of the panel which was uppermost during fabrication thereof is now reversed, that is, the panel has been turned over. This precaution is important to allow the grout which has collected on the bottom asbestos cement sheet during the filling operation to be evenly spread throughout the core. A second similar jig is laid on the panel placed on the first jig and this procedure is continued to build up a stack of panels and jigs as indicated in Figure 6 so that the necessary pressure for pressing out the bulge in the panel is applied by the weight of the panels and jigs in the stack. The top panel in such a stack is weighted by a jig placed on it and a suitable weight 22 or a fully matured panel placed on top of that jig. The weight of any one panel in the stack is regulated by the design of the jig which transmits the load through the frame of a panel as soon as the bulge is flattened out. This will be apparent from a considertaion of Figure 6.

Modifications may, of course, be made in the form of panel so far described to suit varying requirements. For example, for some purposes in some sizes and shapes of panel, the corner brackets 13 may not be required, nor the internal allel spaced-apart relation, as shown. The frame may also be varied in form and section, as well as the method of mounting the asbestos cement sheet to the frame. Thus, for example, by way of further illustration, a panel may be constructed of the form illustrated in Figures 4 and 5, in which is similarly employed a closed rectangular light wooden frame 23 which, however, in this case forms no projecting moulding but mainly acts as a distance piece between the pair of asbestos cement sheets 24. The frame 23 is assembled from ordinary rectangular section battens and the facing sheets 24 cut to the same size as the frame are fastened by nails 25 or otherwise to the frame over its framing members. As before, one sheet is so fastened in the first instance, so as to form with the frame an open box which after slurrying the asbestos sheet as previously described, is then packed with the cement-coated wood wool composition, the other sheet after slurrying then being fixed to the top of the box to close it, hand pressure being brought to bear on it to counteract the internal pressure of the packing, as the fastening proceeds. With this form of panel no jigs are needed, as such panels may be stacked one upon another commencing with a level surface, the panels being inverted in stacking as previously described and the top panel of the stack being weighted. The panel is provided with countersunk screw holes 26 for assembly purposes, these holes preferably being made after the fabricated panel has been fully matured.

It will be appreciated from the foregoing description that in the fabrication of the panel the frame and facing sheets together form a closed box which acts as a mould in which the wood wool and cement filling is moulded to the shape of the box mould under pressure, and that the mould forms part of the finished panel, constituting an exterior shell, while the moulded composition forms the rigid core of the panel, filling the shell. This is an important aspect of the invention, distinguishing it from other panels and methods of manufacture in which the materials comprised in the article are pressed together in a conventional press mould.

The combination of materials specified in connection with the described embodiments is preferred, as it results in panels which possess a combination of desirable properties, especially those of strength with lightness and good heat insulation, and which also are easy and inexpensive to manufacture. The asbestos cement sheeting has the particularly good property of bonding excellently with the cement-coated wood wool, owing to the similar nature of the two materials, both being compositions of fibrous material and cement. Thus, not only is the cellular core a rigid body in itself when set and hardened, but also owing to the bonding between the core and facing sheets, the latter provide the cellular core with skins forming an integral part of the mass, which enhances the already considerable tensile strength which the core possesses by virtue of the interlocking of the long wood wool fibres.

While it is preferred to employ the materials stated for the facing sheets and core, it is not desired to limit the invention thereto, since other combinations of materials may usefully be employed. The sheets may consist of any suitable facing material, such as plastic material or any of the known kinds of fibrous building board. For the core likewise, any suitable plastic composition may be employed, such as bitumen and cork; wood chips or sawdust and a synthetic resin; expanded rubber or rubber substitute; foamed cement; or concrete of lightweight types.

Furthermore, while normally a correctly filled panel will have no unintentional cavities in the core, it may be required or found desirable, for example for some particular purpose of use of the panel, to pack the core composition in such fashion as deliberately to provide an air space or air spaces within the fabricated panel.

We claim:

A building panel, comprising, a rectangular frame including side and end members, said side members being each provided with spaced slots, a pair of facing sheets supported in substantially parallel spaced relation on said members of the frame, a flexible tie element threaded through the slots of the side members to provide a loop whose free ends are accessible at one of the side members, whereby, the tie element may be placed in tension and the ends of said tie members secured to one of the side members, and an interior filling packed between the inner edges of the frame and between said facing sheets.

BERNARD BRUNTON.
ROLFE GILBERT BOOTH.